United States Patent [19]

Petrovich

[11] Patent Number: 4,862,593
[45] Date of Patent: Sep. 5, 1989

[54] SAW CHAIN HOOK ANGLE GAUGE
[75] Inventor: Michael V. Petrovich, Portland, Oreg.
[73] Assignee: Blount, Inc., Portland, Oreg.
[21] Appl. No.: 169,979
[22] Filed: Mar. 18, 1988
[51] Int. Cl.[4] .......................... B23D 59/00; G01B 5/20
[52] U.S. Cl. ...................................................... 33/202
[58] Field of Search ........................................ 33/202
[56] References Cited

U.S. PATENT DOCUMENTS 2,705,376  4/1955  Cox .......................................... 33/202
3,055,115  9/1962  Tyrrell .................................... 33/202
4,567,792  2/1986  Baldwin .................................. 33/202

OTHER PUBLICATIONS

"Chain Saw Age", p. 46, Radius Gauge Reveals Grinding Accuracy, Silvey Radius Gauge, Nov. 1986.

Primary Examiner—William A. Cuchlinski, Jr.
Assistant Examiner—Thomas B. Will
Attorney, Agent, or Firm—Robert L. Harrington

[57] ABSTRACT

A hook angle gauge having a bar with a straight bottom edge that lays across the cutting corners of successive cutting links in a length of saw chain. A face plate includes a series or row of holes or openings that simulate the cross section of the file used to sharpen the cutting links. Different height placements of the openings relative to the bar edge indicate different hook angles. An operator slides the face plate across a selected cutting link side plate until an opening therein matches the configuration of the side plate cutting edge. Each opening is marked with the hook angle setting indicated by that opening to enable the operator to determine the cutting link's hook angle.

3 Claims, 1 Drawing Sheet

SAW CHAIN HOOK ANGLE GAUGE

FIELD OF INVENTION

This invention relates to a device for use by chain saw operators for determining the hook angle of a saw chain cutting link.

BACKGROUND OF THE INVENTION

The cutting chain of a chain saw as contemplated herein is made up of a repeating sequence of interconnected links. Certain of the links are cutting links and each cutting link has a leading cutting edge. The leading cutting edge is made up of a top plate cutting edge and a side plate cutting edge. These cutting edges intersect to form a bend or corner, and the bend or corner (which can be sharp or rounded) forms a part of the leading cutting edge, i.e. the cutting edge is continuous and has side and top cutting edge portions and a corner cutting edge portion.

The cutting edge portions are simultaneously sharpened, typically with a round file that is drawn across the edges in a precise manner. The configuration of the three cutting edge portions and their relationship is dramatically affected by the manner of sharpening. The chain saw operator's production capability and even safety can be impacted by the cutting edge configuration and a great deal of attention is directed to achieving the desired cutting edge configuration.

One of the most significant features of the cutting edge configuration is the hook angle. The hook angle, at least for the purpose of this description, is considered from a side view of the side plate cutting edge. A reference plane is considered to be established along the chain length through the successive cutting edge corners (at the high point of the corners). A perpendicular line to the reference plane at the corner of the cutter being examined is the base line. A line from the corner of the cutting link through the point on the side plate cutting edge that is 0.020 inches down from the reference plane establishes an angle with the base line that is the hook angle.

The hook angle indicates the sharpness of the top plate cutting edge and establishes the aggressiveness of the cutting link. A cutting link that is too aggressive can overload the chain saw capability and can create a potential safety hazard. A cutting link that is not aggressive enough will cause the chain saw as well as the sawyer to work harder for less production.

Accordingly, there is a desired hook angle. The desired hook angle will not be the same from one type of cutting link to the other, or even for the same cutting link type in different types of wood. Also, a saw chain manufacturer may recommend one hook angle setting whereas a professional sawyer may prefer another. Regardless of what is desirable it is necessary that the various hook angles be identifiable. As the reader will appreciate from the definition of the hook angle given above, it is not a simple task to examine the cutting link and identify from that examination the hook angle of the cutting link.

BRIEF DESCRIPTION OF THE INVENTION

It is the purpose of the present invention to enable the examination of a cutting link and to determine from that examination the hook angle of the cutting edge configuration. The present invention includes a device that has a bar with a flat side that lays across the saw chain cutting edges and establishes the reference plane, as that term is used in the description of the hook angle given above. A depending plate is affixed to the bar and lies along the sides of the cutting links in the cutting chain. Circular holes or openings through the plate are located in a row along the plate so that the flat underside of the bar, i.e. the reference plane, can be seen through the holes. The holes are formed relative to this reference plane with the first hole having the plane passing through the near mid-point of the hole and then progressively being higher for successive holes.

Each hole determines a particular hook angle setting. For example, eight holes along the side plate can represent eight different hook angle settings at five-degree increments from a 10 degrees hook angle to a 45 degrees hook angle. An operator desiring to know the hook angle setting of the cutting links of his saw chain will place the device on his saw chain and then view a cutting link's side plate cutting edge through the holes. Because the cutting edge generally is sharpened with a round sharpening surface (a round file), the configuration of the side plate is a segment of a circle, and more specifically, it is a segment within an upper quadrant of the circle. All the operator does is select the cutting link he wishes to examine (or each cutting link in sequence) and then slides the device along the chain until one of the holes in the side plate matches the configuration of the side plate cutting edge of the selected cutting link. He can then read off the hook angle setting from the information given on the device.

The invention will be more clearly understood by reference to the following detailed description and drawings wherein.

Figure 1:
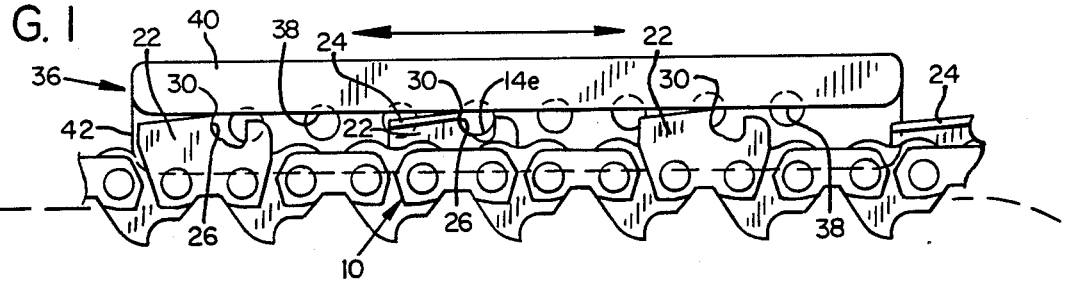
FIG. 1 illustrates a saw chain having cutting links whose hook angle is being checked by a hook angle gauge of the present invention.
Figure 2:
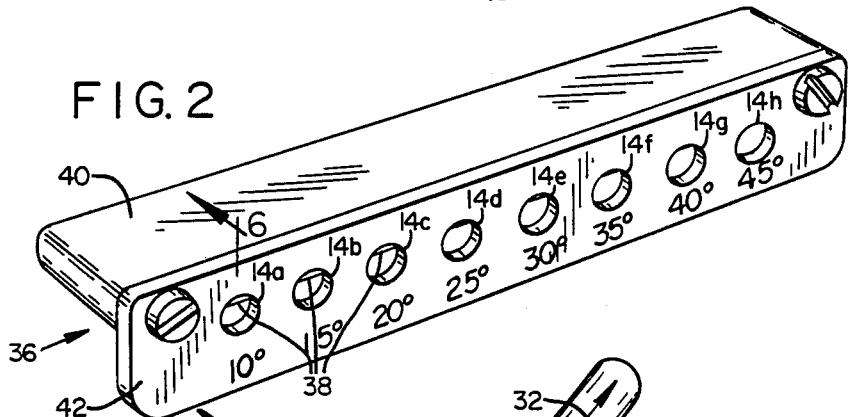
FIG. 2 is an enlarged perspective view of the hook angle gauge of FIG. 1.
Figure 5:
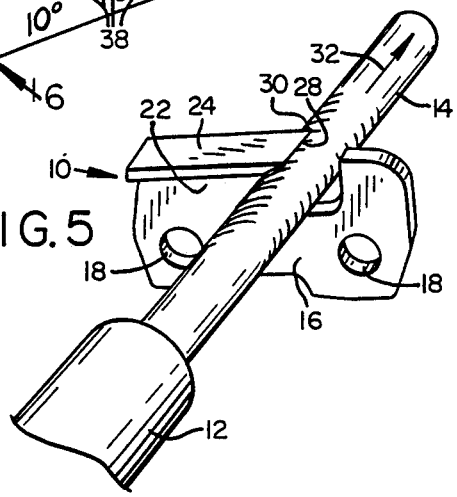
FIG. 5 illustrates a cutting link of the saw chain in perspective view with its cutting edges being sharpened.
Figure 3:
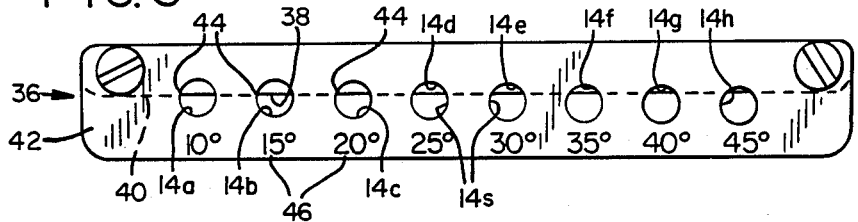
FIG. 3 is a side view of the hook angle gauge of FIG. 2.
Figure 4A:
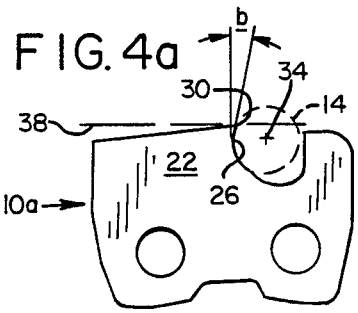
FIGS. 4a, 4b and 4c are saw chain cutting links having different hook angles for illustrating the concept of the hook angle gauge.
Figure 4B:
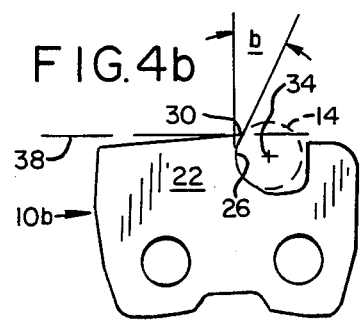
Figure 4C:
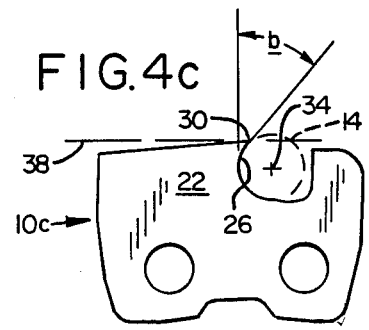

FIG. 1 illustrates the cutting chain from the right hand side but with the hook angle gauge being used to check left hand cutting links, i.e. with the plate 42 extended along the left hand cutting links behind the chain as viewed in FIG. 1. FIGS. 2 and 3 are views of the gauge from the opposite side to that shown in FIG. 1. FIGS. 4a, 4b and 4c depict three right hand cutting links 10a, 10b and 10c, respectively, having different hook angle settings. FIG. 5 is a pictorial view of a left hand cutting link being hand filed, as customary for sharpening "in the field". A handle 12 and an elongated cylindrically-shaped sharpening shaft 14 are directed from the inside out (arrow 32). Right and left hand cutting links are simply mirror images of each other and the entire description herein is applicable to both. The different positions for different cutting links (right and left hand) are provided to more fully illustrate the gauge and its operation.

The cutting link 10 includes a body portion 16 provided with front and rear rivet holes 18. A cutter portion extends upwardly from the body portion 16 and includes a side plate 22 and a top plate 24. The side plate 22 is provided with a leading side cutting edge 26 and the top plate 24 is provided with a leading top cutting edge 28. The side cutting edge 26 and top cutting edge 28 intersect to form a leading cutting edge point, or corner, 30. The transition from side plate 22 to top plate 24 may vary between a rounded to a somewhat square corner. This in part dictates the configuration of cutting corner 30.

The two cutting edges 26, 28 and corner 30 are simultaneously sharpened by the axial movement of the file shaft 14 as indicated by arrow 32 in FIG. 5. The result of the filing action produces a configuration of the side cutting edge 26 that can be represented by any one of the FIGS. 4a, 4b or 4c. The difference between these cutting edge configurations results from the vertical placement of the file shaft 14. The cross section of file shaft 14 is represented in FIGS. 4a, 4b and 4c by the dash line circles 14. Point 34 indicates the longitudinal centerline of the circle 14.

With the file in a somewhat raised position with its center 34 only slightly below a line 38 denoting the height of corner 30, as in FIG. 4a, that area of the side cutting edge 26 that is immediately below cutting corner 30, and which conforms to a segment of the circle 14 that is just above a horizontal line passing through the center point 34, is only slightly angled, i.e. it has a small hook angle b. In general, that same small hook angle is provided across the top plate cutting edge 28 as will be appreciated from the perspective view of FIG. 5. Such a hook angle is dull or non-aggressive and creates considerable difficulty for the sawyer.

Note the configuration of the corresponding portion of side plate cutting edge 26 of FIG. 4c conforming to the segment of the circle 14 that is substantially above the center point 34, i.e. the file shaft 14 is positioned lower relative to the cutting edge corner 30. Here the hook angle b is very great, generating a very aggressive cutting action. The hook angle b of FIG. 4b is illustrated as being in between the non-aggressive cutting link of FIG. 4a and the very aggressive cutting link of FIG. 4c.

From the above, the reader should appreciate the significance of slight variations in the relative positions as between the sharpening shaft 14 and the cutting edges 26, 28 and corner 30, during sharpening. Reference is now made to FIGS. 1, 2, 3 and 6 for an explanation of the hook angle gauge 36.

The hook angle gauge 36 includes a bar 40 that is straight and sufficiently long to span at least three cutting links 10 of a saw chain length (see FIG. 1). A face plate 42 is fixed to one side edge of the bar 40 as illustrated in FIG. 2. Holes 14a–h are provided in the face plate 42. Holes 14a–h are all of the same size and conform to a particular file shaft size. For example, if the diameter of the file shaft 14 is 7/32 inch, the openings 14a–h are preferably about the same size, i.e. in a range of about 6/32 to 8/32 of an inch.

Figure 6:
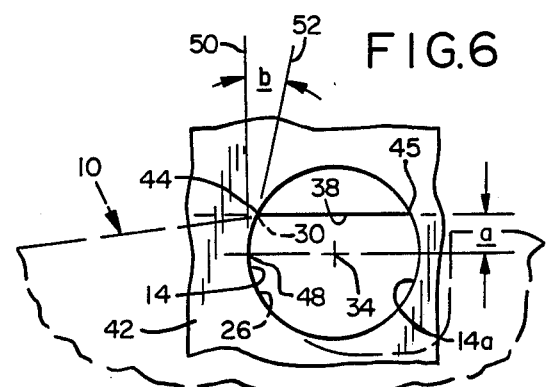
FIG. 6 is an illustration of a cutting link being checked by a gauge hole of the hook angle gauge indicated as 6—6 in FIG. 2.

The bottom surface of bar 40 is laid across the highest points on the cutting links which are cutting points 80. This bottom surface is the reference plane 38 that is exposed through the openings 14a–h. The openings 14a–h are carefully located relative to the reference plane 38 to provide an ascending or descending sequence of hook angle indications. In the embodiment illustrated in FIGS. 2 and 3, the hook angle "settings" 46 are angular settings in five-degree increments from 10 degrees to 45 degrees. With reference to FIG. 6 (an enlargement of opening 14a of the gauge as compared to a right hand cutting link shown in dash lines which closely simulates the link of FIG. 4a), the angular settings are determined by measuring down from point 44 (the intersection of plane 38 with the left side of circle 14) a vertical distance a of 0.020 inches to find point 48. A line 52, drawn through points 44 and 48, is then measured against vertical line 50 which is drawn through point 44 (perpendicular to reference plane 38) to determine the angular setting of the opening 14 (that angle b being 10 degrees for the setting in FIG. 6).

The circular openings 14a–h provided in plate 42 simulate the dashed circles 14 in FIGS. 4a, 4b and 4c (which in turn represent the cross section of file 14 in FIG. 5). With reference to FIG. 6, the operator laterally positions the corner cutting edge 30 of a selected cutting link 10 at the intersection 44, i.e. the intersection of the reference plane 38 with the left side of circular opening 14. The edge of the circular opening 14 that is just below intersection 44 (e.g. a distance of about 0.020 inch) will conform to the cutting edge 26 when the proper opening 14a–h is matched to the cutting link. (In this case, opening 14a) Simply reading the angle 46 shown below the specific one of the openings 14a–h will identify the approximate hook angle of the cutting link 10 being examined.

It will be appreciated that the cutting link shown in FIG. 6 is a right hand cutting link but that the same concept is applicable for left hand cutting links. For left hand cutting links, the right side of the circular opening 14 is matched to the side cutting edge (the cutting edge corner being positioned at the intersection of reference line 38 at the right side of the circular opening, i.e. intersection point 45).

Whereas the embodiment disclosed uses actual angular settings, the objective is to provide an indication of the hook angle setting relative to some predetermined standard. Thus the hook angle settings could be identified for example, as letters "a" through "h" (corresponding to the reference numbers 14a through 14h) as long as each setting is being compared to a known setting that produces a known result.

IN OPERATION

The operation of the hook angle gauge 36 is illustrated in FIG. 1. The bar 40 with its straight underside is laid across a length of saw chain, spanning at least two and preferably three cutting links 10 (as shown, spanning two right hand cutting links and an intermediate left hand cutting link). The straight underside of the bar rests on the highest points of the saw chain which is the cutting edge corners 30. This locates the straight edge or reference line 38 as heretofore described along the cutting corners. A specific cutting link is selected. The bar 40, its face plate 42, and more particularly the indication holes 14a–h are slid across the selected cutting links until a segment of the circular edge of one of the openings 14a–h is matched to the corresponding portion of side cutting edge 26. If a cutting link like that of FIG. 4a were being examined, the match-up would occur with the indication opening 14a indentified as a 10 degree hook angle in FIG. 2. FIG. 4b would be about a 25 degree hook angle matching up with opening 14d and FIG. 4c would be about a 40 degree hook angle matching up with opening 14g. Depending on the purpose of the examination, the examiner would be able to determine (a) whether the manufacturer's standards were being satisfied, (b) whether the hook angle met the sawyer's desired aggressiveness objective, (c) whether hook angle safety standards were being met, and the like. These determinations would all be based on the knowledge previously acquired as to desired hook angle settings. These desired settings would, of course, be established using the same setting definitions as that applied to the hook angle gauge.

Others will conceive of variations to the invention, the scope of which is defined in the claims appended hereto.

I claim:

1. A hook angle guide for determining hook angle settings of the cutting links in a length of saw chain, said cutting links having a cutting link portion defining a side cutting edge, a top cutting edge, and an interconnecting cutting corner, the guide comprising;

a bar member having a straight bottom surface adapted to be laid across the saw chain in contact with the cutting corner of a cutting link for establishing a reference plane for the hook angle guide, a face plate fixedly attached to and depending from the bar member and extending below said reference plane, said face plate adapted to be superimposed over the side cutting edge of at least one of said cutting links, said face plate having a plurality of indicator openings all having the same size opening and applicable to the same size saw chain, said openings positioned in a row along the face plate, each of said indicator openings defining a similar upper edge portion that is a segment of an upper quadrant of a circle, and each opening exposing a portion of the reference plane, and each of said reference plane portions positioned to intersect the segment of the circle of successive indicator openings at different positions with the portion of the segment of the circle immediately below the intersection indicating a specific hook angle setting and the sequence of openings indicating successively different hook angle settings.

2. A hook angle guide as defined in claim 1 wherein a marking is provided on the face plate for each of the indicator openings.

3. A method for gauging the hook angle setting of a saw chain cutting link having a cutter portion with a leading cutting edge defining a top cutting edge, a side cutting edge and an intersecting cutting corner, which method comprises;

determining a reference plane by the placement of a straight edge in contact with the cutting corner of said cutting link, providing a face plate with a row of hook angle indicator openings having a similar size and being applicable to a common size saw chain, said openings defining a segment of an upper quadrant of a circle that is in fixed relation to the straight edge, said reference plane intersecting the segments at incrementally different height positions, each indicator opening with its differently positioned reference plane defining a simulated side cutting edge configuration from the intersection downward therefrom a determined portion of the segment, and the simulated side cutting edge configuration of each opening being calibrated to a determined hook angle setting having known cutting properties, providing on said face plate a marking for each opening of the determined hook angle, moving the bar across the cutting link of the applicable saw chain and thereby sliding the openings of the face plate across the side cutting edge of the cutting link until an opening of the face plate has a simulated side cutting edge configuration that matches the side cutting edge of the cutting link, and reading the marking for that opening to thereby determine the hook angle setting of the cutting link.

* * * * *